US011803938B2

(12) United States Patent
Feimster

(10) Patent No.: US 11,803,938 B2
(45) Date of Patent: **\*Oct. 31, 2023**

(54) VIRTUAL LOCATION MANAGEMENT COMPUTING SYSTEM AND METHODS THEREOF

(71) Applicant: Uncle Monkey Media Inc., Sherman Oaks, CA (US)

(72) Inventor: Timothy M. Feimster, Sherman Oaks, CA (US)

(73) Assignee: Uncle Monkey Media Inc., Sherman Oaks, CA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 17/493,902

(22) Filed: Oct. 5, 2021

(65) Prior Publication Data

US 2022/0028032 A1 Jan. 27, 2022

Related U.S. Application Data

(63) Continuation of application No. 16/737,981, filed on Jan. 9, 2020, now Pat. No. 11,170,465.

(60) Provisional application No. 62/797,428, filed on Jan. 28, 2019.

(51) Int. Cl.
| | |
|---|---|
| *G06T 19/00* | (2011.01) |
| *H04N 21/81* | (2011.01) |
| *G06T 3/00* | (2006.01) |
| *H04N 5/222* | (2006.01) |
| *H04N 21/431* | (2011.01) |
| *H04L 65/403* | (2022.01) |
| *G06T 19/20* | (2011.01) |

(52) U.S. Cl.
CPC .......... *G06T 3/0087* (2013.01); *G06T 19/006* (2013.01); *G06T 19/20* (2013.01); *H04L 65/403* (2013.01); *H04N 5/2224* (2013.01); *H04N 21/431* (2013.01); *H04N 21/816* (2013.01); *G06T 2215/16* (2013.01)

(58) Field of Classification Search
CPC ..................................................... G06T 19/006
See application file for complete search history.

(56) References Cited

U.S. PATENT DOCUMENTS

| | | | | |
|---|---|---|---|---|
| 10,403,050 | B1* | 9/2019 | Beall | G06T 7/292 |
| 10,521,865 | B1* | 12/2019 | Spader | G06V 20/64 |
| 2004/0051732 | A1* | 3/2004 | White | G06F 16/40 |
| | | | | 715/736 |
| 2013/0182225 | A1* | 7/2013 | Stout | G03B 15/10 |
| | | | | 352/89 |
| 2016/0063087 | A1* | 3/2016 | Berson | G06F 16/24564 |
| | | | | 707/740 |
| 2018/0341811 | A1* | 11/2018 | Bendale | G06V 10/25 |

\* cited by examiner

*Primary Examiner* — Ryan McCulley
(74) *Attorney, Agent, or Firm* — Frost Brown Todd LLP

(57) ABSTRACT

Systems and methods are provided for allowing stakeholders in the video production industry to perform location scouting and other film-related processes via virtual reality devices. Imagery can be collected from a plurality of different physical locations. Subsequently, directors, location managers, directors of photography, production designers, and others, can virtually view each of the different physical locations using a virtual reality device. Attributes regarding the physical locations that are relative to filming can also be collected and provided to the users.

20 Claims, 14 Drawing Sheets

VIRTUAL LOCATION MANAGEMENT COMPUTING SYSTEM AND METHODS THEREOF

CROSS-REFERENCE TO RELATED APPLICATION

This application is a continuation of U.S. patent application Ser. No. 16/737,981, filed on Jan. 9, 2020, entitled VIRTUAL LOCATION MANAGEMENT COMPUTING SYSTEM AND METHODS THEREOF, which claims the benefit of U.S. provisional patent application Ser. No. 62/797,428, filed on Jan. 28, 2019, entitled VIRTUAL LOCATION MANAGEMENT COMPUTING SYSTEM AND METHODS THEREOF, the disclosures of which are incorporated herein by reference in their entirety.

BACKGROUND

Location scouting is a process that typically occurs in the pre-production stage of filmmaking and commercial photography. Once scriptwriters, producers, or directors have decided what general kind of scenery they require for the various parts of their work that is shot outside of the studio, the search for a suitable place or "location" outside the studio begins. Depending on the project, location scouting trips may include one or more people, such as a director, a location manager, a director of photography and a production designer. Location scouting trips may involve extensive travel between various locations of interest. As a result, location scouting activities can be time consuming, expensive, and logistically complicated.

BRIEF DESCRIPTION OF THE DRAWINGS

The present disclosure will be more readily understood from a detailed description of some example embodiments taken in conjunction with the following figures.

DETAILED DESCRIPTION

Figure 1:
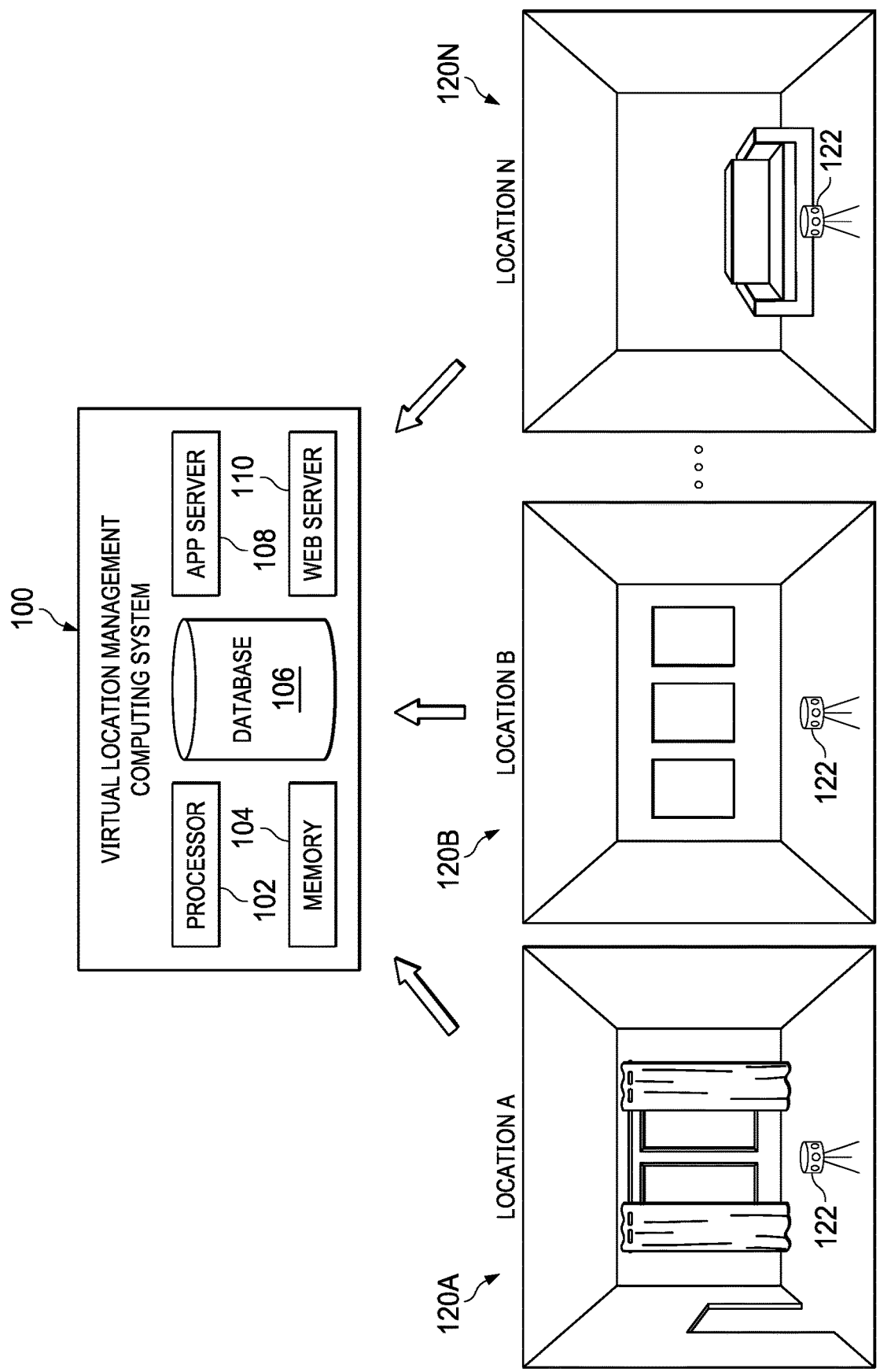
FIG. 1 schematically depicts real-world locations having physical properties that can be collected by the virtual location management computing system for subsequent presentation to a user of the system in a virtual reality environment.

Various non-limiting embodiments of the present disclosure will now be described to provide an overall understanding of the principles of the structure, function, and use of a virtual location management computing system as disclosed herein. One or more examples of these non-limiting embodiments are illustrated in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment, or "in an embodiment" in places throughout the specification are not necessarily all referring to the same embodiment. Furthermore, the particular features, structures or characteristics may be combined in any suitable manner in one or more embodiments.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term software is used expansively to include not only executable code, but also data structures, data stores, and computing instructions in any electronic format, firmware, and embedded software. The terms information and data are used expansively and can include a wide variety of electronic information, including but not limited to machine-executable or machine-interpretable instructions; content such as text, video data, and audio data, among others; and various codes or flags. The terms information, data, and content are sometimes used interchangeably when permitted by context.

The examples discussed herein are examples only and are provided to assist in the explanation of the systems and methods described herein. None of the features or components shown in the drawings or discussed below should be taken as mandatory for any specific implementation of any of these systems and methods unless specifically designated as mandatory. For ease of reading and clarity, certain components, modules, or methods may be described solely in connection with a specific figure. Any failure to specifically describe a combination or sub-combination of components should not be understood as an indication that any combination or sub-combination is not possible. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Described herein are example embodiments of a virtual location management computing system for providing virtual reality and/or augmented reality environments for use by various users, such as stakeholders in the video production industry. Example users of the system can include, without limitations, directors, location managers, directors of photography, production designers, gaffers, grips, set dressers, set designers, set builders, and the like.

Referring to FIG. 1, an embodiment of a virtual location management computing system 100 is depicted. Generally, the virtual location management computing system 100 can be used to store 360-degree spatial information regarding various locations 120A-N for on-demand presentation to one or more users via a virtual reality interface. FIG. 1 schematically depicts real-world locations 120A-N that are representative of any suitable physical location having properties that can be collected by the virtual location management computing system 100 for subsequent presentation to a user of the system. In this regard, the real-world locations 120A-N can be anywhere in the world and can be either inside or outside environments. Thus, while FIG. 1 shows each of the locations 120A-N as residential rooms for the purposes of illustration, this disclosure is not so limited.

In order to collect data from each of the real-world locations 120A-N, any suitable type of camera system 122 can be physically positioned within the environment. As is to be appreciated, the camera system 122 can be a 360-degree camera that includes a plurality of different image capturing devices in order to collect information from the real-world location 120A-N in a 360-degree format. Example camera systems 122 include, for example, the Insta360 Pro II Spherical VR 360 8K and the Ricoh Theta SC Spherical Digital Camera. The camera system 122 can be generally stationary, as illustrated, or can be physically moved through the environment as it collects data. Further, in some embodiments, the camera system 122 can be a volumetric camera. In some embodiments, the camera system 122 can be used to collect imagery from the locations 120A-N at different times of day, such as sunrise, noon, sunset, and/or night so that subsequent viewers of the location in a virtual reality environment can choose the time of day that most closely matches the scene they would be shooting at the location.

The spatial information collected by the camera system 122 for each of the real-world locations 120A-N can be transmitted to the virtual location management computing system 100 using any suitable data transmission techniques. In some embodiments, additional location-specific information, sometimes referred to as attributes, can also be provided to the virtual location management computing system 100 by a user. The location-specific information can include, for example, technical information regarding the location, such as utility information, parking information, and so forth. The location-specific information can also include dimensional information, such as the size of doorways, and so forth. The location-specific information can also include logistical information, such as the distance to the closet airport, the location of the closest hospital, and so forth. Generally, the location-specific information can include any information that may be useful by a user to determine whether a particular real-world location is suitable for the needs of a particular project.

The virtual location management computing system 100 can be provided using any suitable processor-based device or system, such as a personal computer, laptop, server, mainframe, or a collection (e.g., network) of multiple computers, for example. The virtual location management computing system 100 can include one or more processors 102 and one or more computer memory units 104. For convenience, only one processor 102 and only one memory unit 104 are shown in FIG. 1. The processor 102 can execute software instructions stored on the memory unit 104. The processor 102 can be implemented as an integrated circuit (IC) having one or multiple cores. The memory unit 104 can include volatile and/or non-volatile memory units. Volatile memory units can include random access memory (RAM), for example. Non-volatile memory units can include read only memory (ROM), for example, as well as mechanical non-volatile memory systems, such as, for example, a hard disk drive, an optical disk drive, etc. The RAM and/or ROM memory units can be implemented as discrete memory ICs, for example.

The memory unit 104 can store executable software and data for the virtual reality platform described herein. When the processor 102 of the virtual location management computing system 100 executes the software, the processor 102 can be caused to perform the various operations of the virtual location management computing system 100, such as collecting information from real-world locations, hosting an interface to allow users to select certain locations for viewing, presenting the locations in virtual reality environments, tracking ratings and notes regarding the environments, and tracking and presenting attributes associated with the various locations.

Data used by the virtual location management computing system 100 can be from various sources, such as a database (s) 106, which can be electronic computer databases, for example. The data stored in the database(s) 106 can be stored in a non-volatile computer memory, such as a hard disk drive, a read only memory (e.g., a ROM IC), or other types of non-volatile memory. In some embodiments, one or more databases 106 can be stored on a remote electronic computer system, for example. As it to be appreciated, a variety of other databases, or other types of memory storage structures, can be utilized or otherwise associated with the virtual location management computing system 100.

The virtual location management computing system 100 can include one or more computer servers, which can include one or more web servers, one or more application servers, and/or one or more other types of servers. For convenience, only one web server 110 and one application server 108 are depicted in FIG. 1, although one having ordinary skill in the art would appreciate that the disclosure is not so limited. The servers 108, 110 can allow content to be sent or received in any of a number of formats, which can include, but are not limited to, text-based messages, multimedia messages, email messages, smart phone notifications, web pages, and other message formats. The servers 108, 110 can be comprised of processors (e.g. CPUs), memory units (e.g. RAM, ROM), non-volatile storage systems (e.g. hard disk drive systems), and other elements.

In some embodiments, the web server 110 can provide a graphical web user interface through which various users can interact with the virtual location management computing system 100. The graphical web user interface can also be referred to as a client portal, client interface, graphical client interface, and so forth. The web server 110 can accept requests, such as HTTP/HTTPS requests, from various entities, such as HTTP/HTTPS responses, along with optional data content, such as web pages (e.g. HTML documents) and linked objects (such as images, video, and so forth). The application server 108 can provide a user interface, for users who do not communicate with the virtual location management computing system 100 using a web browser. Such users can have special software installed on their computing devices to allow the user to communicate with the application server 108 via a communication network. Through interactions with the web server 110 and/or the application server 108, a user can manage attributes of various real-world locations, or otherwise interface with the virtual location management computing system 100.

Figure 2:
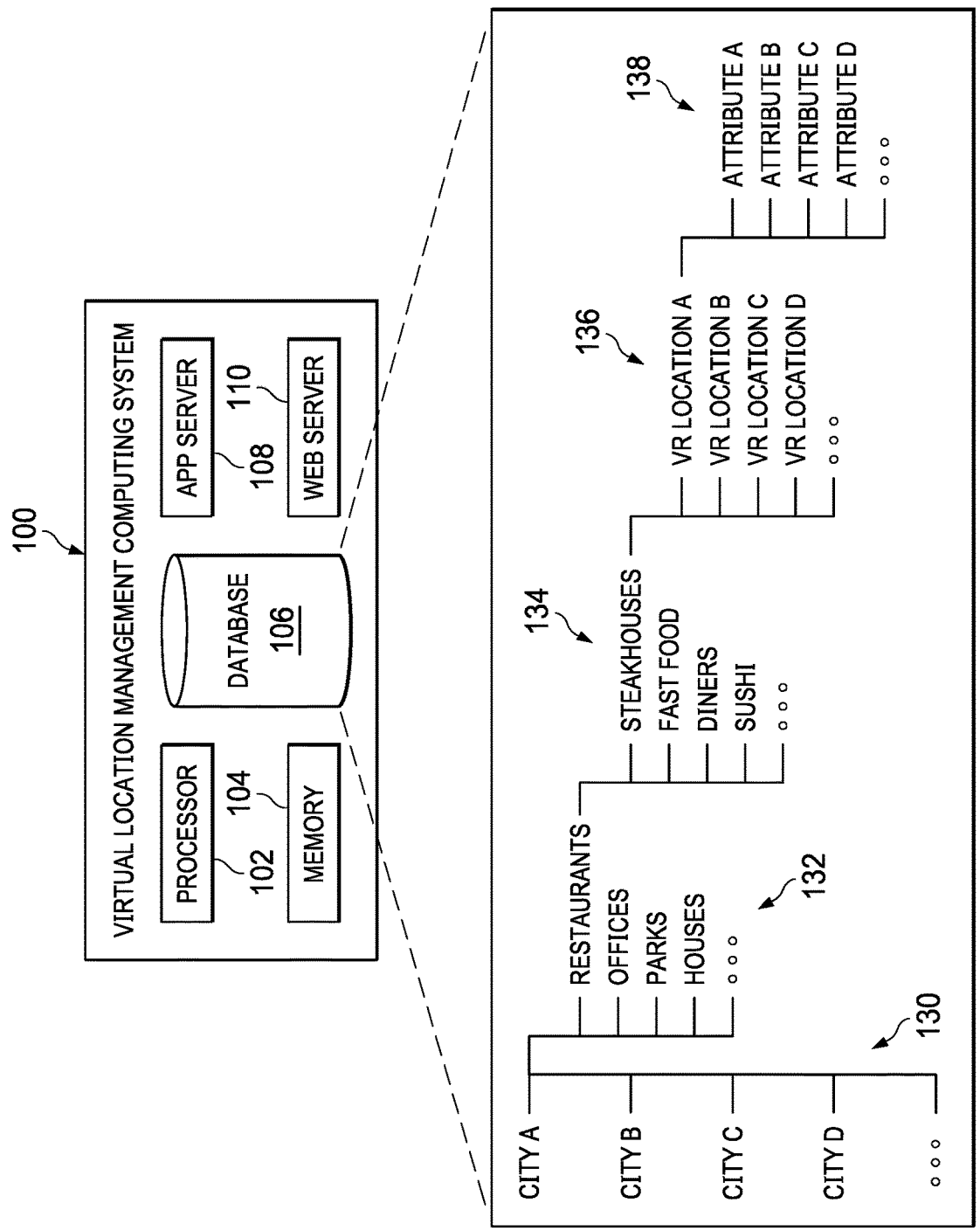
FIG. 2 schematically depicts a non-limiting example location scouting data that is catalogued and stored by a database of a virtual location management computing system.

Referring now to FIG. 2, a non-limiting example of location scouting data stored by the database 106 is schematically depicted. In some embodiments, a user of the virtual location management computing system 100 can interact with an interface to search and navigate the location scouting data to identify a real-world location suitable for a project. Users of the virtual location management computing system 100 can access the data stored in the database 106 via any suitable type of interface and through any type of searching, such as keyword searching or natural language queries, for example. As is to be appreciated, while an example data hierarchy is depicted in FIG. 2, any suitable data hierarchy can be used to store and access the data stored by the database 106.

In FIG. 2, the hierarchy includes a city listing 130 that lists each city having locations stored by the system. Within each city, a location type listing 132 is provided. Thus, if a user knows a city in which they desire to shoot, they can navigate to that city via an interface and view a listing of the location types that have been collected and cataloged. In this example embodiment, the location type listing 132 can allow a user to broadly select a particular type of location, such as a restaurant, an office, and so forth. Within location type, a location sub-type listing 134 can be provided to a user for various location types. The location sub-type listing 134 can allow a user to fine tune the real-world locations that may be relevant to the project. As shown, virtual reality locations A-D appear in a VR location listing 136. The virtual reality locations A-D are thus locations where a camera system 122 (FIG. 1) has been previously deployed to collect spatial data. As shown, the database 106 can also store attributes 138 for each of the locations for presentation to the user, as described in more detail below.

Figure 3:
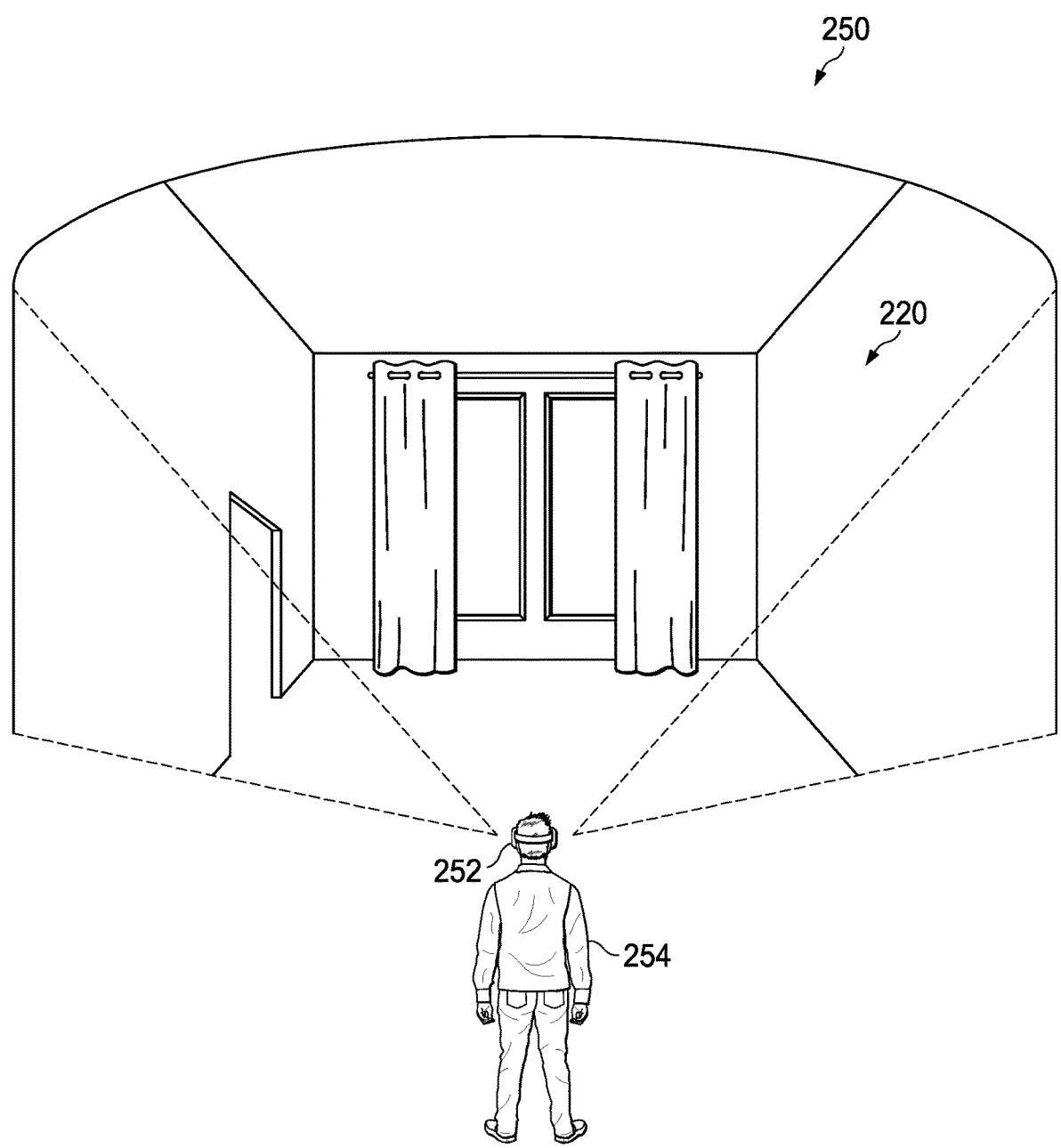
FIG. 3 schematically depicts a virtual location management computing system providing a virtual reality environment that is viewable by a user.

Referring now to FIG. 3, once a real-world location has been selected, the virtual location management computing system 100 can host, or otherwise provided, a virtual reality environment 250 viewable by a user 254 using any suitable virtual reality device 252. The virtual reality device 252 is schematically shown as a headset, such as those provided by Oculus®, HTC®, Samsung®, and so forth. However, the present disclosure is not limited to headsets, as any suitable device can be used to access the virtual reality environment. Furthermore, while not shown in FIG. 3, it is to be appreciated that the virtual reality device 252 can include other accessories, such as handheld units or other types of controllers, to allow the user 254 to interact with the virtual reality environment 250.

In FIG. 3, the virtual location management computing system 100 is hosting a virtual location 220 for the user 254 that is representative of the real-world location 120A (FIG. 1). In this regard, the user 254 can have a 360-degree immersive experience in the virtual location 220 based on the image data previously collected by the camera system 122 (FIG. 1). Depending on the type of image information collected at the real-world location 120A, the virtual location 220 can either be a static image or can be a video. Further, in some embodiments, the user 254 can select from various time of day options in order to view the location under various lighting conditions.

Figure 4:
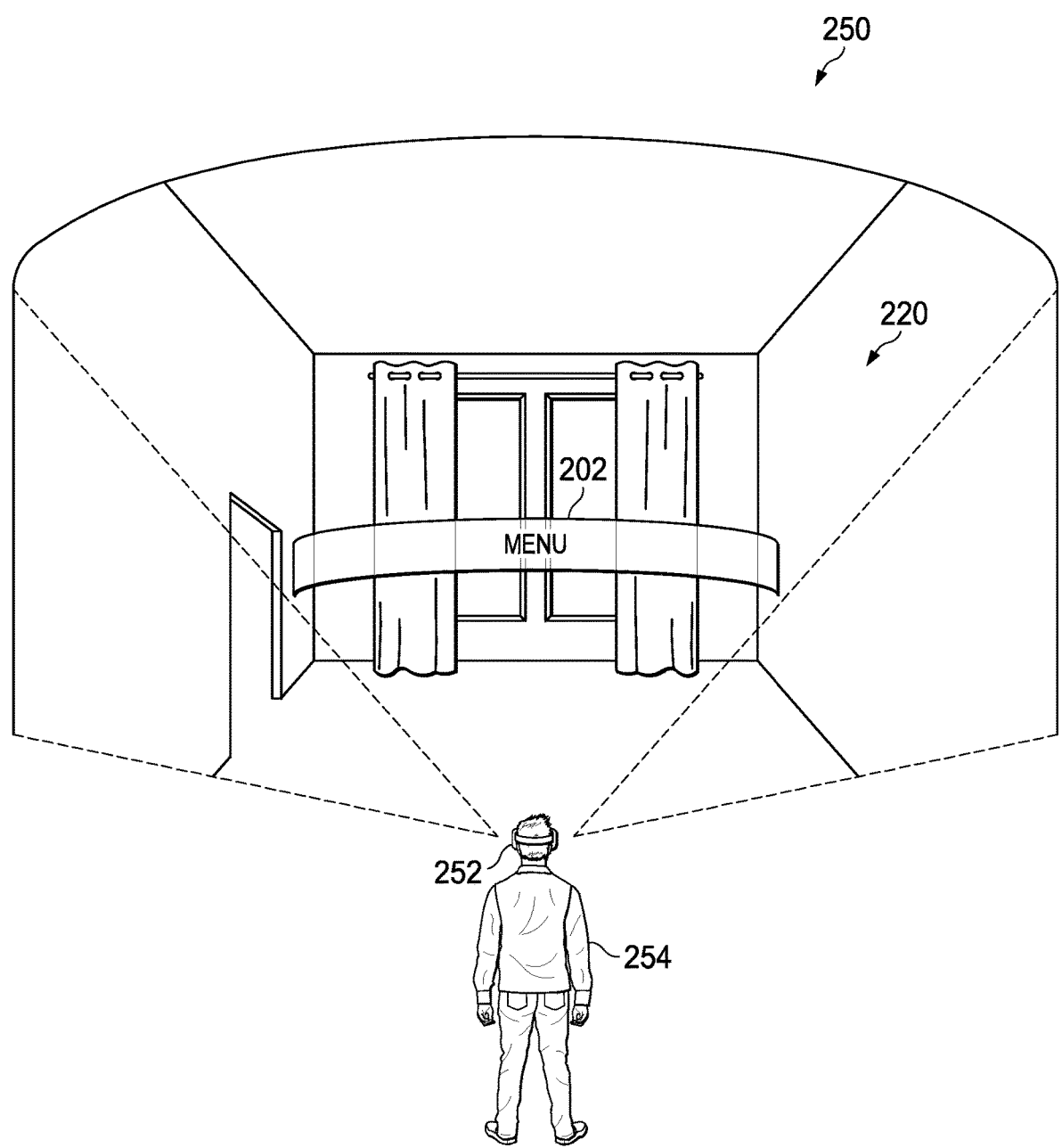
FIG. 4 schematically depicts a virtual location management computing system providing a virtual reality environment that includes an interactive menu that is viewable by a user.

FIG. 4 schematically illustrates an example menu 202 that can be provided to user 254 by the virtual location management computing system 100. The menu 202 can provide access to a number of different options or features. The user 254 can interact with the menu 202 through any suitable means, such as via voice command, a handheld controller, and/or gesture-based control. While the options on the menu 202 can vary, example menu options can allow the use 254 to view various attributes, take notes, provide a rating of the location, navigate between rooms or spaces within the location, and/or view a different location.

Figure 5:
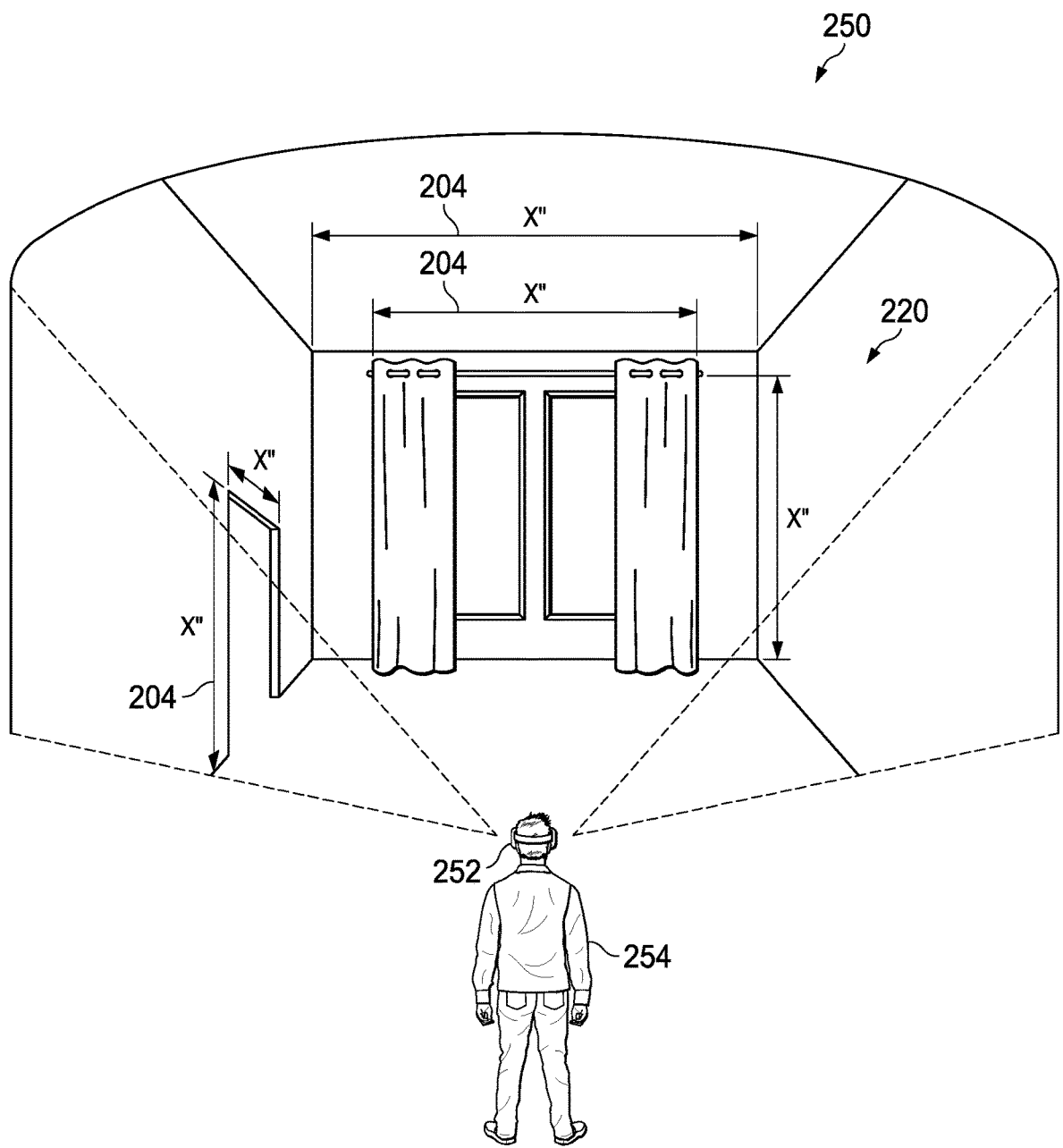
FIG. 5 schematically depicts a virtual location management computing system providing a virtual reality environment that shows location attributes of a location to the user.

FIG. 5 illustrates example location attributes that may be presented to the user 254 within the virtual reality environment 250. As shown, dimensions 204 are shown in an augmented reality technique in order to provide the user 254 with pertinent dimensional information. For example, the dimensions 204 can provide information regarding doorway sizes, window sizes, ceiling height, and so forth. In some embodiments, the dimensions 204 are manually collected during the visit to the real-world location and entered into the virtual location management computing system 100. In some embodiments, the dimensions 204 are automatically determined through image processing and/or laser-aided measurement techniques. As shown, the dimensions can overlay the imagery so that they appear next to the object they are referring to.

Figure 6:
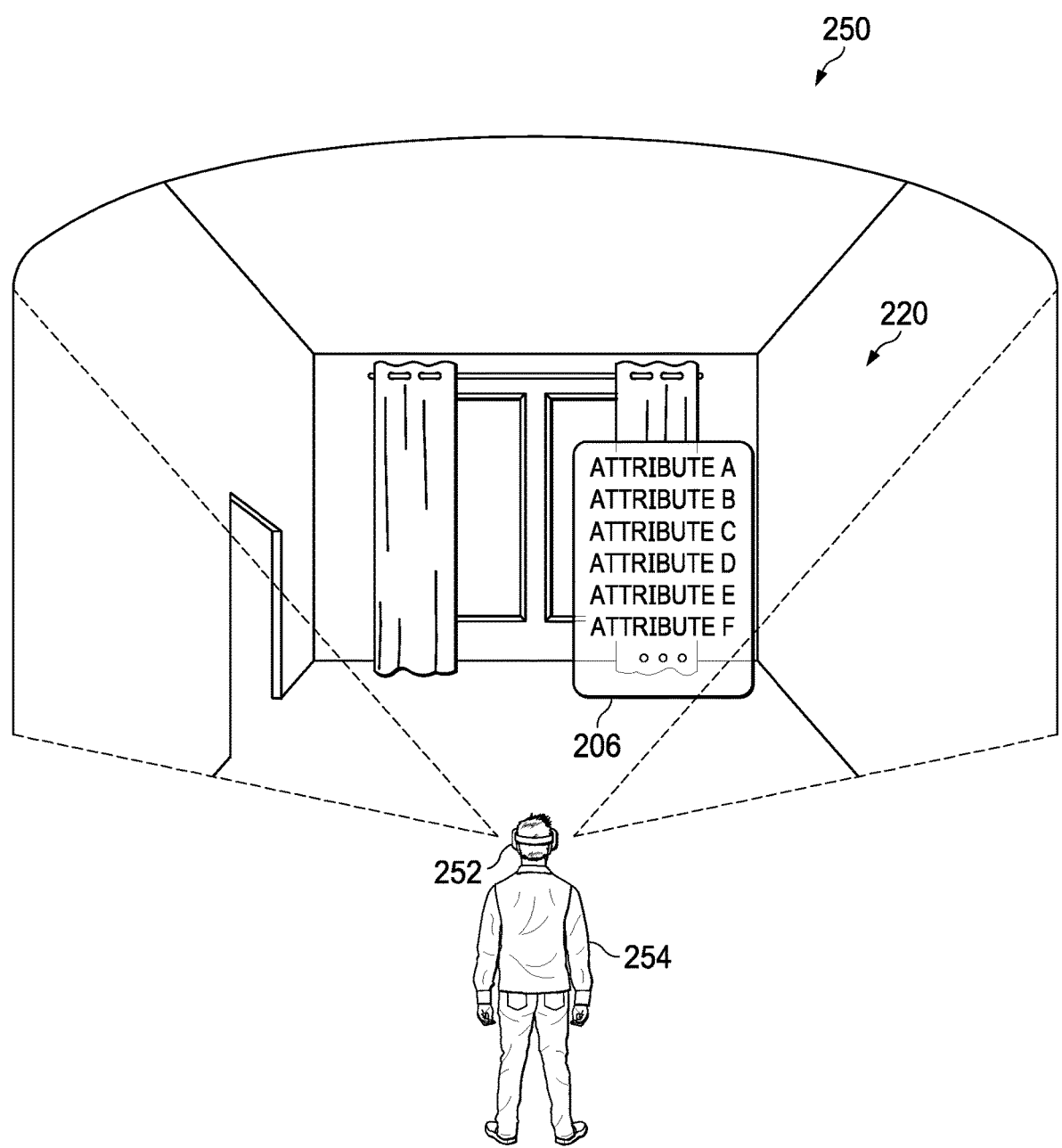
FIG. 6 schematically depicts a virtual location management computing system providing a virtual reality environment that shows an attribute listing of a location to the user.

FIG. 6 illustrates an example attribute listing 206 that can be presented to the user 254 within the virtual reality environment 250. The attribute listing 206 can include one or more attributes 138 (FIG. 2) of the location, such as power utility information, parking information, hospital information, among a wide variety of other location attributes that may be relevant to deciding if a location meets the needs of a particular shoot.

Figure 7:
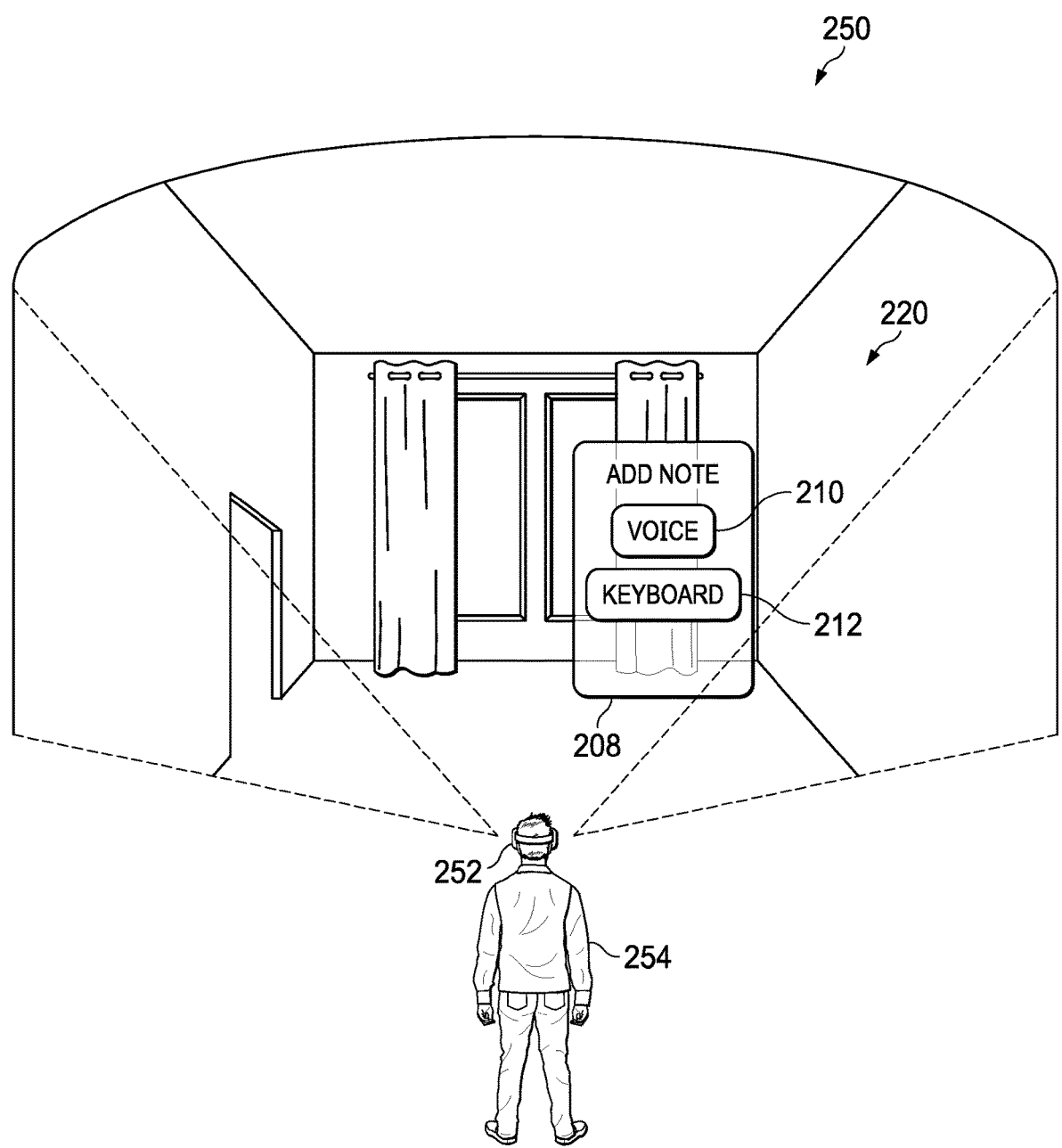
FIG. 7 schematically depicts a virtual location management computing system providing a virtual reality environment that has a note taking interface for the user.

When the user 254 is immersed in the virtual reality environment 250, traditional handwritten note taking may not be practical. FIG. 7 illustrates an example note taking interface 208 that can be presented to the user 254 within the virtual reality environment 250. Accordingly, the note taking interface 208 can provide the user 254 the ability to take notes regarding the location 220 and subsequently access the notes via interactions with the virtual location management computing system 100. In the illustrated embodiment, the note taking interface 208 provides a voice note option 210 to provide dictation-type note taking using voice recognition technology. Additionally, a keyboard option 212 can be selected by the user 254 to present a full QWERTY keyboard to the user 254 within the virtual reality environment 250. The user 254 can interact with the keyboard using a handheld controller, for example, to type notes.

Figure 8:
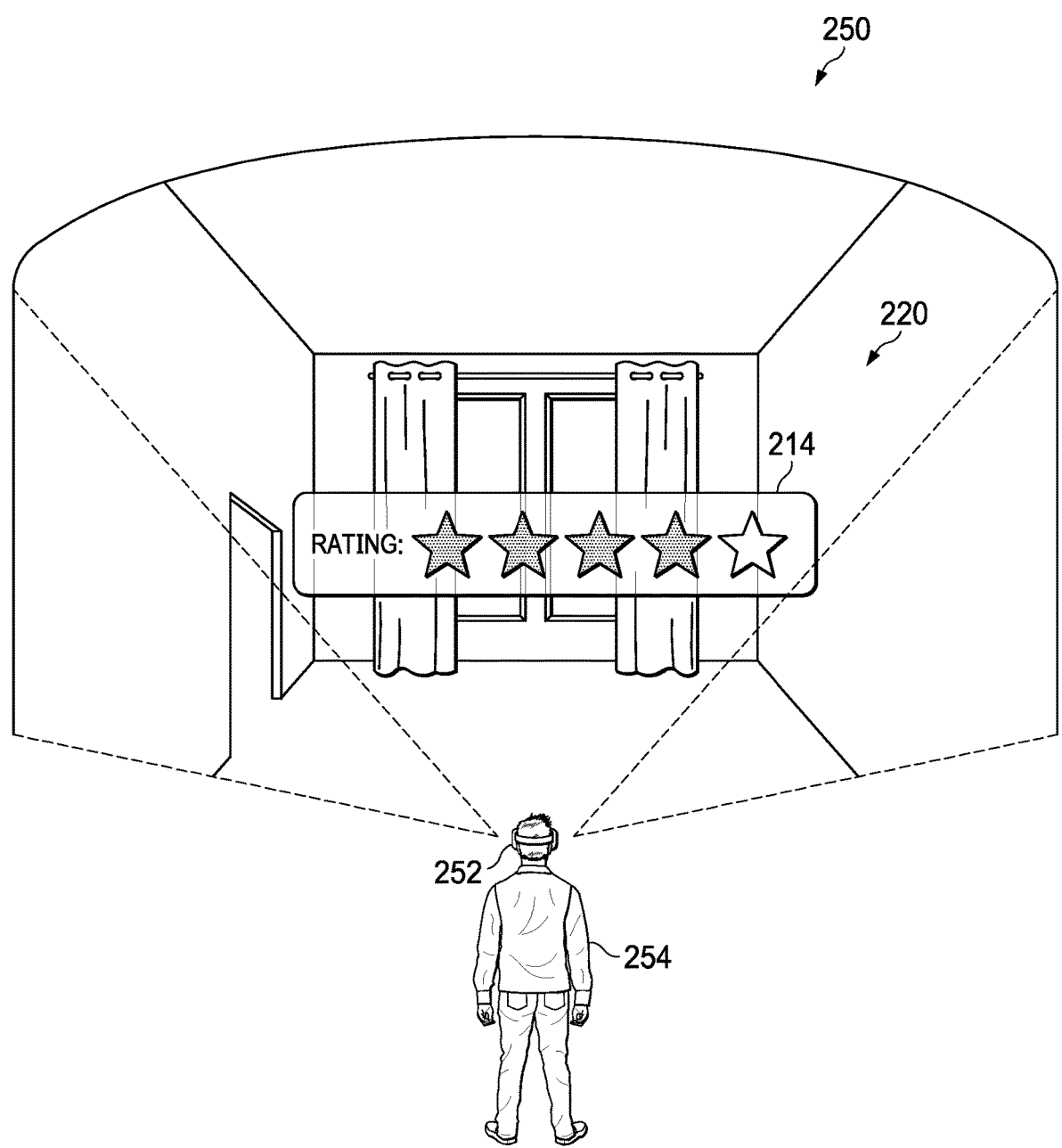
FIG. 8 schematically depicts a virtual location management computing system providing a virtual reality environment that has a rating interface for the user.

In some embodiments, it may be desirable to track a score or other metric for each location being viewed. FIG. 8 illustrates an example rating interface 214 that can be presented to the user 254 within the virtual reality environment 250. While the rating interface 214 is schematically illustrated as a star-based system, it is to be readily appreciated that any suitable rating system can be utilized. The virtual location management computing system 100 can track the ratings provided by the user 254 and subsequently provide the ratings to the user 254 through any suitable means, such as a report or an online interface, for example.

Figure 9A:
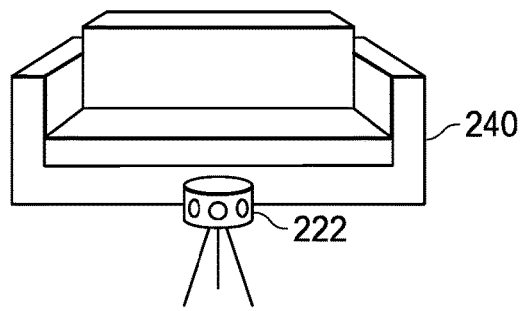
FIG. 9A depicts the collection of imagery of a real-world accessory by a camera system for use by a virtual location management computing system.
Figure 9B:
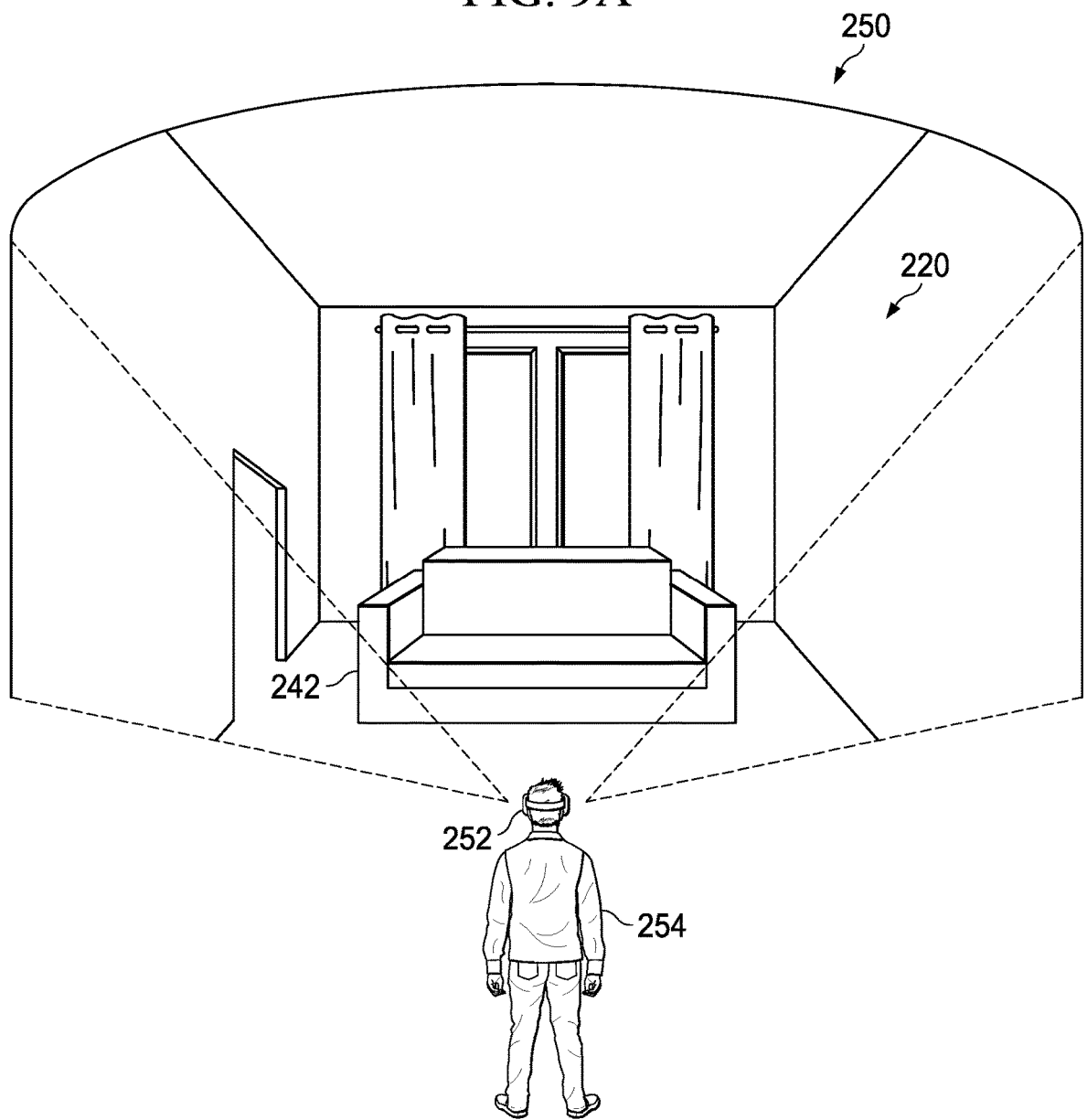
FIG. 9B shows a virtual accessory placed within a virtual location of a virtual reality environment by a virtual location management computing system.

In some embodiments, augmented reality techniques can be used by the virtual location management computing system 100 to provide a user 254 with additional information that may assist them with the decision making processing. Referring to FIG. 9A, imagery from a real-world accessory 240 can be collected by a camera system 222 and provided to the virtual location management computing system 100. While the accessory 240 is schematically shown as a sofa, any suitable 3-D object can be scanned with the camera system 222 for subsequent placement within a virtual environment by the virtual location management computing system 100. FIG. 9B shows a virtual accessory 242 placed within the virtual location 220. Accordingly, the user 254 can visualize how the real-world accessory 240 would look within the physical real-world location 120A (FIG. 1) without requiring the real-world accessory 240 to physically be within the space.

Figure 10:
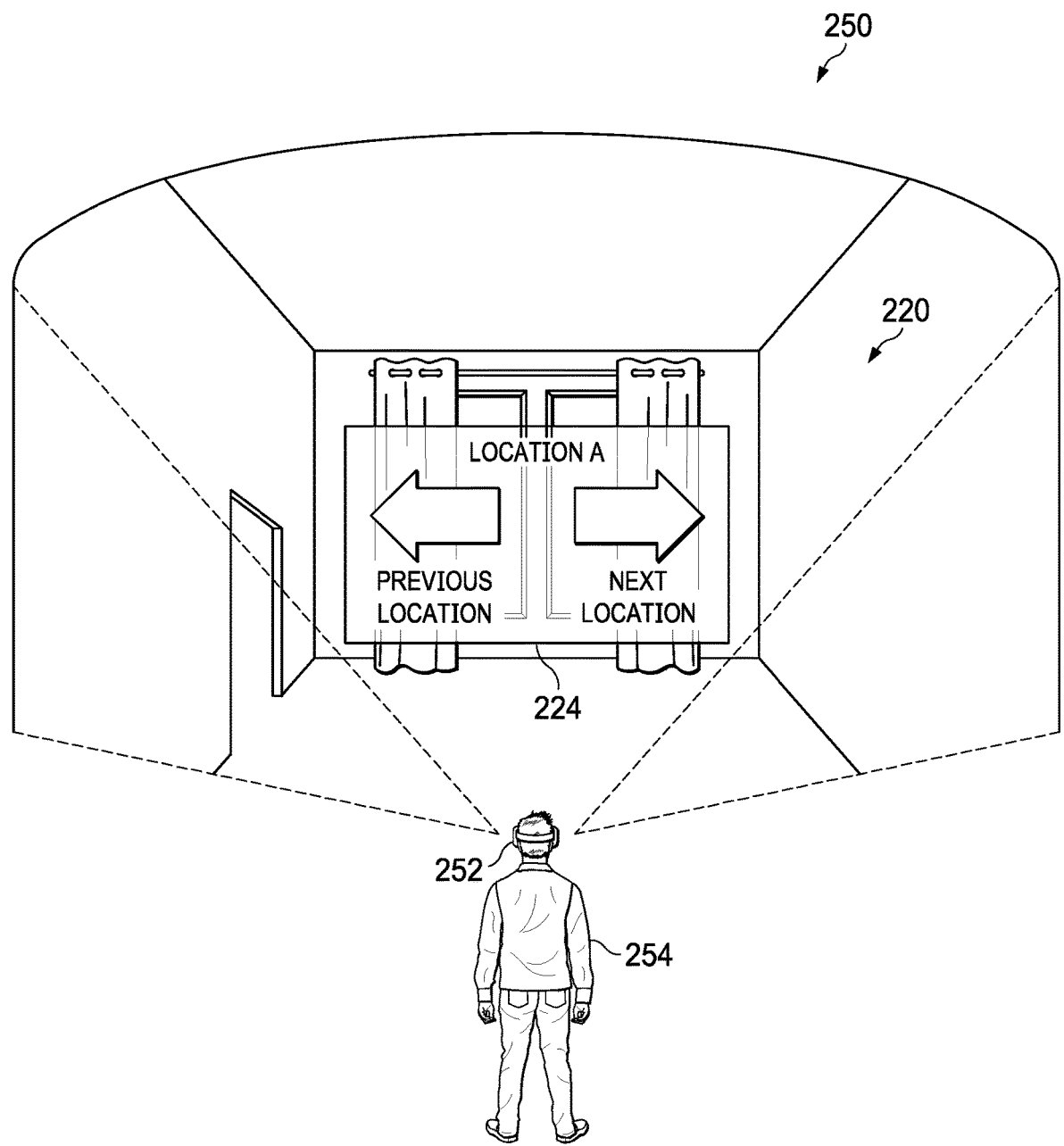
FIG. 10 illustrates an example navigation interface that can be presented to a user within a virtual reality environment.

As is to be appreciated, a user 254 of the virtual location management computing system 100 may desire to view multiple locations within a single session. FIG. 10 illustrates an example navigation interface 224 that can be presented to the user 254 within the virtual reality environment 250. Through the navigation interface 224 the user 254 can instruct the virtual location management computing system 100 to display particular locations within the virtual reality environment 250. While arrow-based navigation is depicted in FIG. 10, it is to be appreciated that any suitable navigation interface 224 can be used.

Figure 11:
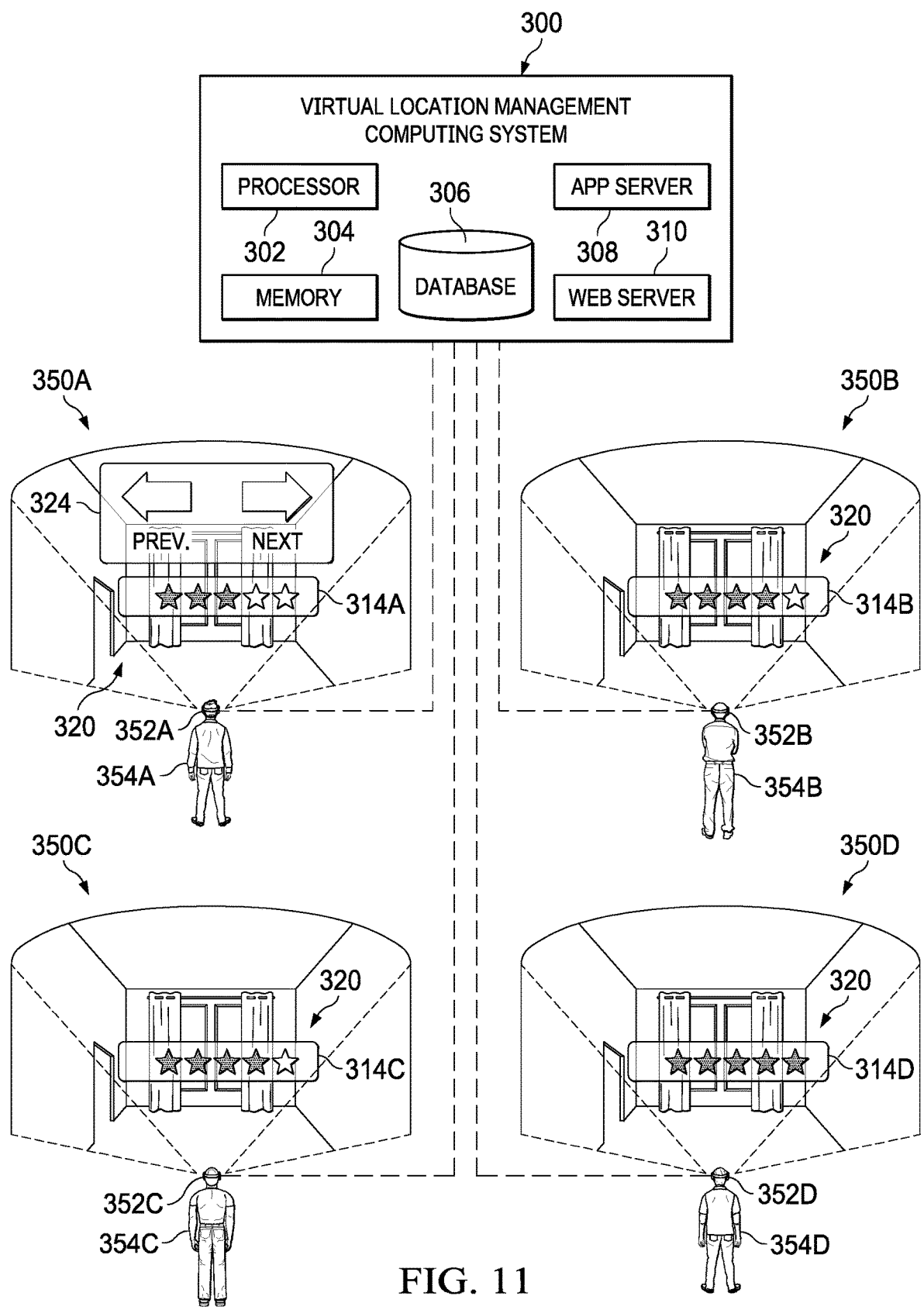
FIG. 11 schematically illustrates a plurality of users that are each viewing a respective virtual reality environment using a virtual reality device in communication with a virtual location management computing system.

As provided above, more than one use may be involved in selecting a real-world location for a particular shoot or project. In accordance with the present disclosure, multiple users can simultaneously be presented with various locations within respective virtual reality environments. FIG. 11 schematically illustrates users 354A-D that are each viewing a virtual location 320 in their respective virtual reality environment 350A-D using a virtual reality device 352A-D in communication with a virtual location management computing system 300. As is to be appreciated, each of the virtual reality device 352A-D can be in communication with the virtual location management computing system 300 through any suitable network connection. Each of the users 354A-D may be physically within the same location (i.e., a conference room) or they may be physically remote from one another. The users 354A-D can be, for example, various people associated with a shoot, such as a director, a location manager, a director of photography or a production designer. In some embodiments, one of the users 354A-D can simultaneously control the virtual reality environments 350A-D of all of the users 354A-D. In FIG. 11, the user 354A has universal control over all the virtual reality environments 350A-D. Accordingly, the user 354A is shown being presented with a navigation interface 324 for selecting which location is presented to all of the users 354A-D.

As is to be appreciated, the group of users 354A-D may virtually visit a large number of different locations in a single viewing sessions. In the illustrated embodiment, a rating interface 314A-D is shown being presented to each of the users 354A-D to collect rating information from each user. Using the rating interface 314A-D, the virtual location management computing system 300 can aid in tracking and compiling feedback from each of the users 354A-D.

It is noted that in some embodiments each user 354A-D can also be presented with a menu, similar to the menu 202 in FIG. 4, for example, within their respective virtual reality environments 350A-D. Each user 354A-D can therefore individually view various attributes associated with the location, such as a measurements, and so forth. Furthermore, while FIG. 11 depicts the user 354A generally controlling the view session, in some implementations, each of the users 354A-D can independently navigate between various virtual locations.

Figure 12:
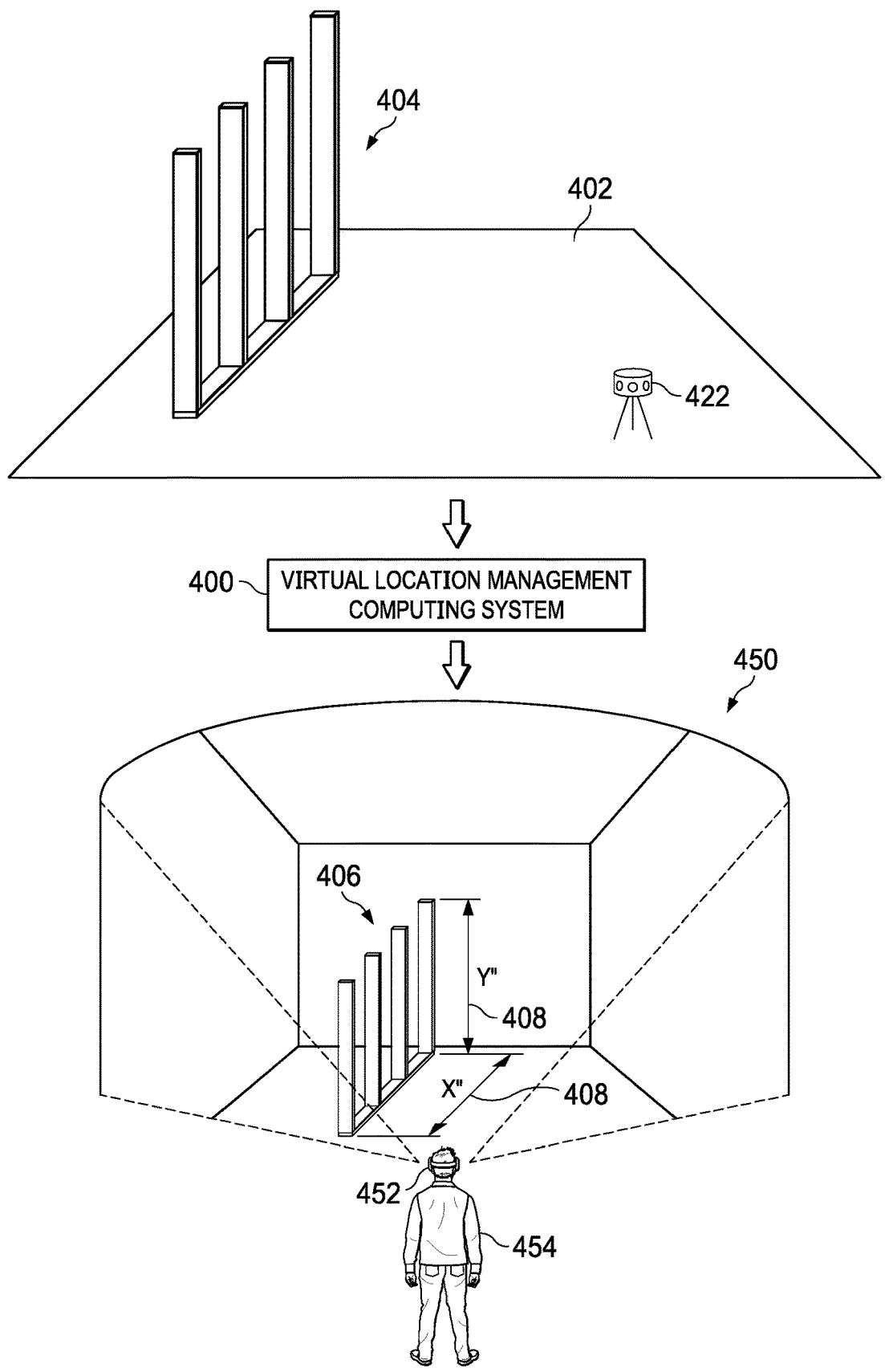
FIG. 12 schematically illustrates a virtual location management computing system aiding with monitoring the progress of a set construction process.
Figure 13:
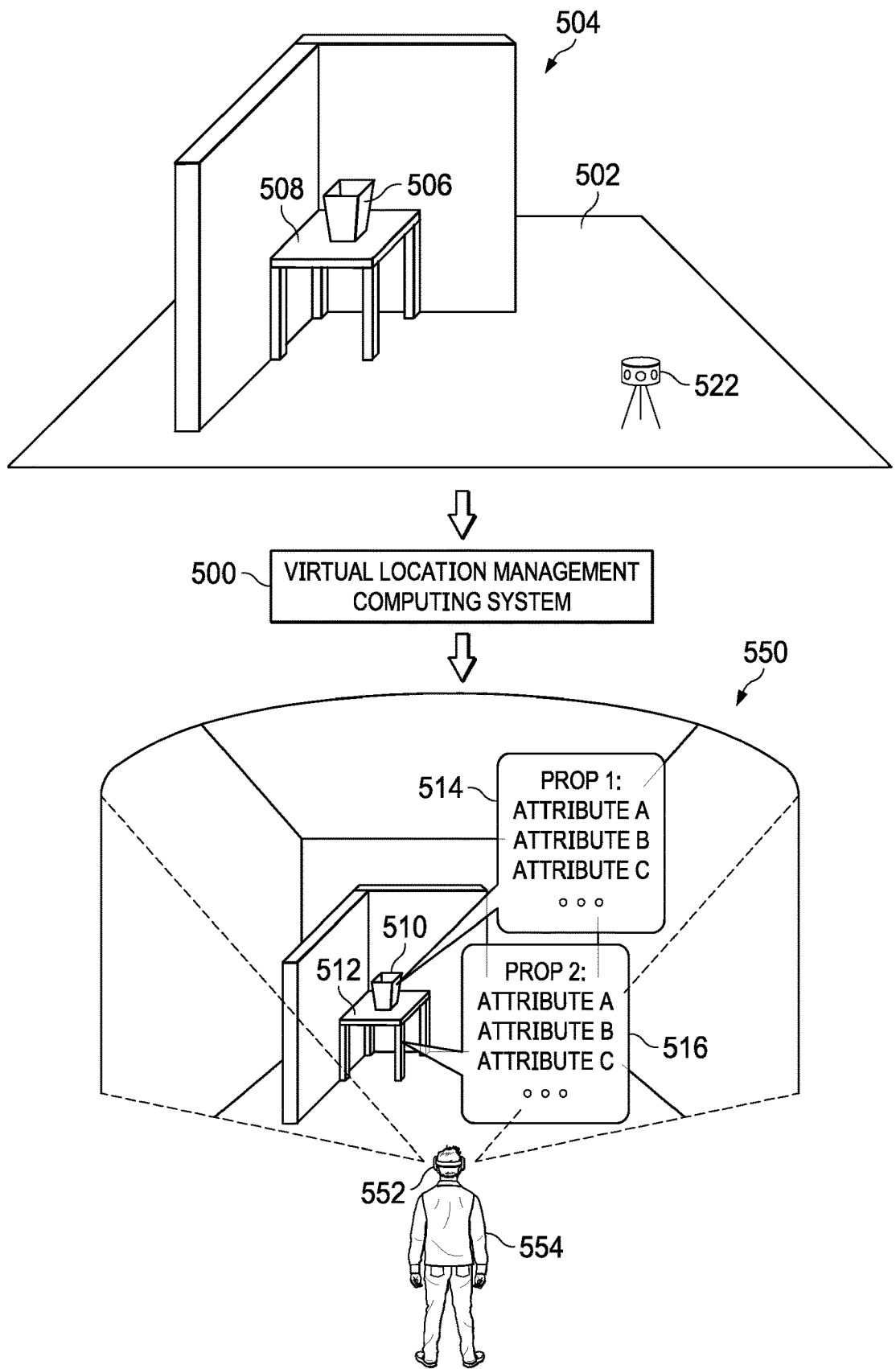
FIG. 13 schematically illustrates a virtual location management computing system aiding with set dressing documentation.

FIGS. 12-13 schematically depict additional implementations of a virtual location management computing system 400 to aid with various aspects of video production. Referring first to FIG. 12, the virtual location management computing system 400 can aid with monitoring the progress of set construction without requiring a user 454 to physically travel to a location 402 where a set 404 is being built. A camera system 422 can be positioned at the location 402, such as a soundstage, for collecting 360-degree image data (still imagery and/or video imagery). The image data can be supplied to the virtual location management computing system 400 for remote viewing by the user 454 using a virtual reality device 452. In some embodiments, the user 454 can view a real-time video feed from the camera system 422. In other embodiments, the user 454 accesses images that were collected by the camera system 422 at a previous point in time. In other embodiments, the user 454 accesses a series of time-lapse images that were collected by the camera system 422 over a particular time span. In any event, the user 454 can view a virtual set 406 within a virtual environment 450 that is hosted by the virtual location management computing system 400. Thus, a set designer can, for example, check in with the status of the set build without having to travel to the location 402 of the build.

Further, in some embodiments, attributes such as measurements 408 can be added to the virtual set 406 through augmented reality. Such attributes can confirm that the set 404 is conforming to the set design. In some embodiments, a rendering of the completed set can be overlaid within the virtual environment 450 to further confirm that the set 404 is conforming to the design. Furthermore, the rendering of the set design can also be altered and presented to the user 454 in the virtual reality environment 450. Thus, potential changes to the set design can be proposed and visualized in the virtual reality environment 450 for consideration by the user 454.

Referring now to FIG. 13, a virtual location management computing system 500 can aid with cataloging and maintaining of set dressing for continuity or other purposes. A simplified version of a set 504 is schematically shown on a soundstage 502. Various props 506, 508 are shown associated with the set 504. A camera system 522 can be positioned proximate to the set 504 and can collect imagery and provide it to the virtual location management computing system 500. As is to be appreciated, the camera system 522 can be used to collect images of the set 504 at any suitable time, such as at the end of shooting, between takes, and so forth.

As shown in FIG. 13, a user 554 using a virtual reality device 552 can view the set 504 in a virtual reality environment 550. Depending on the type of camera system 552 used, the user 554 may be able to zoom into the virtual reality environment 550 to see details of the virtual set. Furthermore, similar to the location attributes described above, the virtual location management computing system 500 can also store attributes associated with the set 504, such as the theatrical properties 506, 508, sometimes referred to as "props". For example, for each theatrical property 506, 508, the virtual location management computing system 500 can maintain various details, such as the prop house that supplied the theatrical property, a theatrical property identification number, an invoice number as well as a variety of other details. Such details can be entered by a set dresser, or other user, through a suitable interface of the virtual location management computing system 500. Thus, when the user 554 views virtual props 510, 512 within the virtual reality environment 550, attributes 514, 516 can be presented. Such attributes can be useful, for example, if the set 504 needs to be reconstructed for re-shooting, among a variety of other purposes. Additionally, in some embodiments, a script supervisor may use the virtual reality device 552 to view the set 504 in the virtual reality environment 550 in real-time during a shoot. The script supervisor can use a note taking interface, such as the note taking interface described in FIG. 7, to take notes regarding an actor's interaction with the props 506, 508.

In some embodiments, a director can access the set 504 via the virtual reality device 552 for pre-shoot planning purposes. For example, the director can navigate to different positions within the set 504 within the virtual reality environment 550 to plan various shots in advance of physically arriving on set 504. In this regard, camera locations, camera lenses, and so forth, can be determined in advance in order to save time and resources. Moreover, in some embodiments, actors can be placed within the virtual reality environment 550 using an augmented reality overlay. Thus, the director can plan shots with the augmented reality actors prior to the actors physically arriving on set 504.

Figure 14:
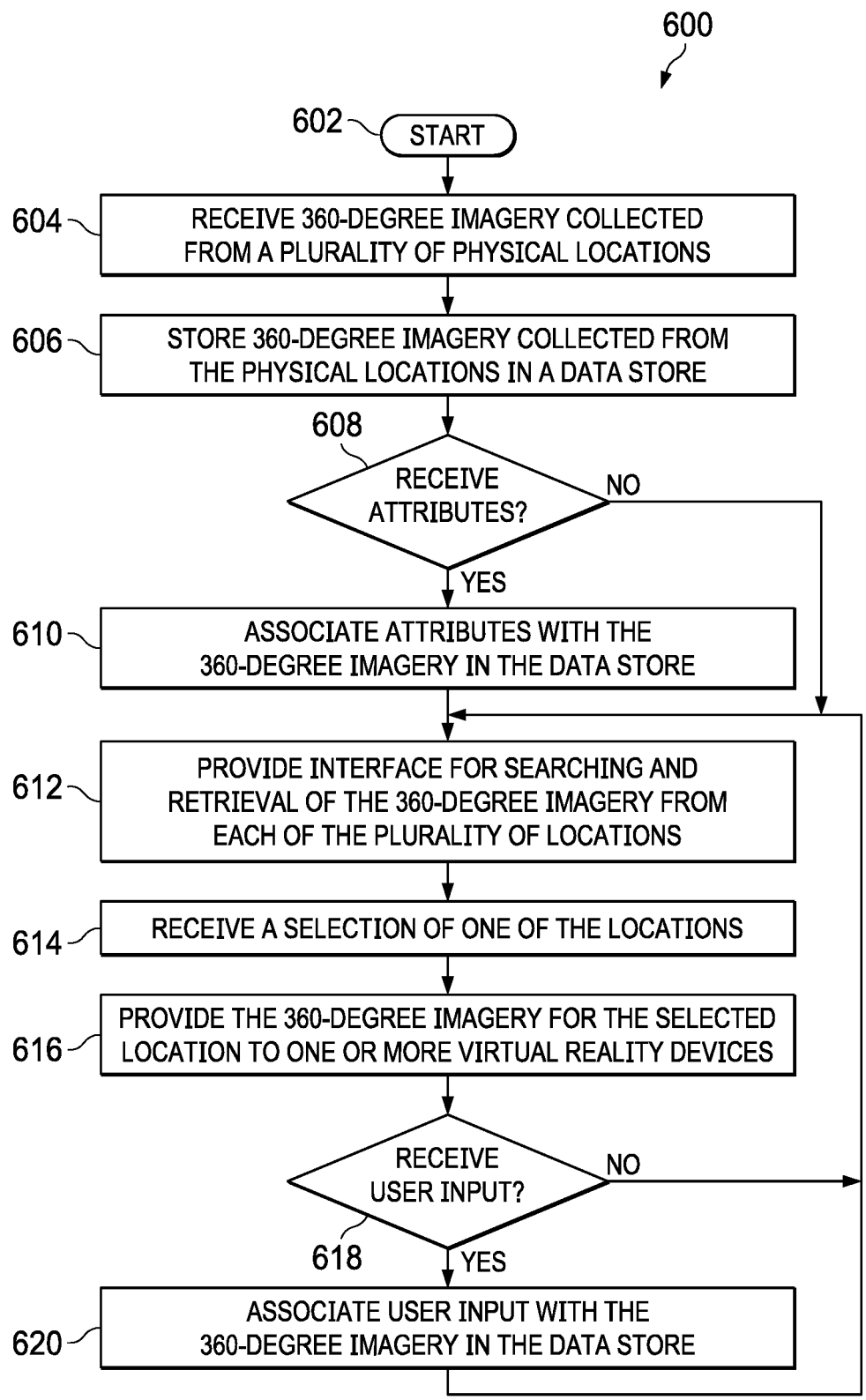
FIG. 14 is an example process flow that can be executed by a virtual location management computing system in accordance with one non-limiting embodiment.

FIG. 14 is an example process flow 600 that can be executed by a virtual location management computing system in accordance with one non-limiting embodiment. At 602, the process starts. At 604, 360-degree imagery is received by the virtual location management computing system. The 360-degree imagery can be collected at a plurality of real-world locations, such as locations 120A-N in FIG. 1 or location 402 in FIG. 12 or location 502 in FIG. 13, for example. Further, the 360-degree imagery can include static images, video images, live video images, and/or combinations thereof, which are collected by various camera systems that are temporarily or permanently deployed at the location. At 606, the 360-degree images are stored in a data store. At 608, it is determined if attributes were received that are associated with any of the real-world locations. If attributes were received, the process proceeds to 610 and associates those attributes with the appropriate 360-degree imagery in the data store. As provided above, the type of attributes that can be received vary from technical attributes, to logistical and dimensional attributes, among others. At 612, an interface is provided for a user to search and retrieve the 360-degree imagery that had previously been collected from the real-world location, or, in the case of live video, the user can search and retrieve the 360-degree imagery that is being collected in real-time from the real-world location. At 614, a selection of one of the locations is received from a user. At 616, the 360-degree imagery of the selected location is provided to a virtual reality headset or other virtual reality viewing device of one or more users. As is to be appreciated, the 360-degree imagery can be provided through any suitable network connection. At 618, it is determined if input is received from the user. Example input can be, for example, notes, rating, attributes, among other types of inputs. If input is received, at 620, the virtual location management computing system can associate the user input with the 360-degree imagery in the data store.

In general, it will be apparent to one of ordinary skill in the art that at least some of the embodiments described herein can be implemented in many different embodiments of software, firmware, and/or hardware. The software and firmware code can be executed by a processor or any other similar computing device. The software code or specialized control hardware that can be used to implement embodiments is not limiting. For example, embodiments described herein can be implemented in computer software using any suitable computer software language type, using, for example, conventional or object-oriented techniques. Such software can be stored on any type of suitable computer-readable medium or media, such as, for example, a magnetic or optical storage medium. The operation and behavior of the embodiments can be described without specific reference to specific software code or specialized hardware components. The absence of such specific references is feasible, because it is clearly understood that artisans of ordinary skill would be able to design software and control hardware to implement the embodiments based on the present description with no more than reasonable effort and without undue experimentation.

Moreover, the processes described herein can be executed by programmable equipment, such as computers or computer systems and/or processors. Software that can cause programmable equipment to execute processes can be stored in any storage device, such as, for example, a computer system (nonvolatile) memory, an optical disk, magnetic tape, or magnetic disk. Furthermore, at least some of the processes can be programmed when the computer system is manufactured or stored on various types of computer-readable media.

It can also be appreciated that certain portions of the processes described herein can be performed using instructions stored on a computer-readable medium or media that direct a computer system to perform the process steps. A computer-readable medium can include, for example, memory devices such as diskettes, compact discs (CDs), digital versatile discs (DVDs), optical disk drives, or hard disk drives. A computer-readable medium can also include memory storage that is physical, virtual, permanent, temporary, semi-permanent, and/or semi-temporary.

A "computer," "computer system," "host," "server," or "processor" can be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein can include memory for storing certain software modules used in obtaining, processing, and communicating information. It can be appreciated that such memory can be internal or external with respect to operation of the disclosed embodiments.

In various embodiments disclosed herein, a single component can be replaced by multiple components and multiple components can be replaced by a single component to perform a given function or functions. Except where such substitution would not be operative, such substitution is within the intended scope of the embodiments. The computer systems can comprise one or more processors in communication with memory (e.g., RAM or ROM) via one or more data buses. The data buses can carry electrical signals between the processor(s) and the memory. The processor and the memory can comprise electrical circuits that conduct electrical current. Charge states of various components of the circuits, such as solid state transistors of the processor(s) and/or memory circuit(s), can change during operation of the circuits.

Some of the figures can include a flow diagram. Although such figures can include a particular logic flow, it can be appreciated that the logic flow merely provides an exemplary implementation of the general functionality. Further, the logic flow does not necessarily have to be executed in the order presented unless otherwise indicated. In addition, the logic flow can be implemented by a hardware element, a software element executed by a computer, a firmware element embedded in hardware, or any combination thereof.

The foregoing description of embodiments and examples has been presented for purposes of illustration and description. It is not intended to be exhaustive or limiting to the forms described. Numerous modifications are possible in light of the above teachings. Some of those modifications have been discussed, and others will be understood by those skilled in the art. The embodiments were chosen and described in order to best illustrate principles of various embodiments as are suited to particular uses contemplated. The scope is, of course, not limited to the examples set forth herein, but can be employed in any number of applications and equivalent devices by those of ordinary skill in the art. Rather it is hereby intended the scope of the invention to be defined by the claims appended hereto.

I claim:

1. A computer-based method, comprising:
    storing, by a virtual location management computing system, 360-degree imagery of a first physical location and 360-degree imagery of a second physical location in a data store;
    storing, by the virtual location management computing system, a first set of attributes associated with the first physical location and a second set of attributes associated with the second physical location in the data store;
    collecting, by the virtual location management computing system, a 3-D scan of a real-world accessory for subsequent placement into a virtual environment;
    storing, by the virtual location management computing system, the 3-D scan of the real-world accessory;
    initiating, by the virtual location management computing system, a multi-user presentation for a plurality of users including at least a presenting user and at least one viewing user;
    in response to a first location selection received from the presenting user, providing, by the virtual location management computing system, the 360-degree imagery of the first physical location to each of the plurality of users through a virtual reality interface at a head mounted virtual reality device that is associated with that user;
    providing, by the virtual location management computing system, the first set of attributes for visual presentment via the virtual reality interface in parallel with the visual presentment of the 360-degree imagery of the first physical location;
    providing, by the virtual location management computing system, a visualization of the real-world accessory physically placed within the first physical location, wherein imagery of the real-world accessory based on the 3-D scan is visually presented within the 360-degree imagery of the first physical location as a virtual accessory;
    while the plurality of users are viewing the 360-degree imagery of the first physical location through the virtual reality interface, receiving, by the virtual location management computing system, a rating associated with the first physical location from at least one of the plurality of users;
    in response to a second location selection received from the presenting user, providing, by the virtual location management computing system, the 360-degree imagery of the second physical location for visual presentment to each of the plurality of users through the head mounted virtual reality device that is associated with that user, and providing the second set of attributes for visual presentment through the virtual reality interface in parallel with the visual presentment of the 360-degree imagery of the second physical location;
    providing, by the virtual location management computing system, a visualization of the real-world accessory physically placed within the second physical location, wherein imagery of the real-world accessory is based on the 3-D scan visually presented within the 360-degree imagery of the second physical location as a virtual accessory; and
    while the plurality of users are viewing the 360-degree imagery of the second physical location through the virtual reality interface, receiving, by the virtual location management computing system, a second rating associated with the second physical location from at least one of the plurality of users.

2. The computer-based method of claim 1, wherein the first set of attributes comprises dimensional information of the first physical location and the second set of attributes comprises dimensional information of the second physical location.

3. The computer-based method of claim 2, wherein the dimensional information of the first set of attributes visually identifies a dimension of a physical attribute of the first physical location using an augmented reality display.

4. The computer-based method of claim 2, wherein the physical attribute is any of a doorway, a window, and a ceiling.

5. The computer-based method of claim 1, wherein the first set of attributes comprises logistical information associated with the first physical location.

6. The computer-based method of claim 5, wherein the logistical information associated with the first physical location comprises parking information.

7. A virtual location management computing system, the virtual location management computing system comprising instructions stored in a memory, which when executed by one or more processors of the virtual location management computing system, cause the virtual location management computing system to:
    store 360-degree imagery of a first physical location and 360-degree imagery of a second physical location in a data store;
    store a first set of attributes associated with the first physical location in the data store;
    store a second set of attributes associated with the second physical location in the data store;

collect a 3-D scan of a real-world accessory for subsequent placement into a virtual environment;
store the 3-D scan of the real-world accessory;
initiate, by the virtual location management computing system, a multi-user presentation for a plurality of users including at least a presenting user and at least one viewing user;
in response to a first location selection received from the presenting user, provide the 360-degree imagery of the first physical location to each of the plurality of users through a virtual reality interface of a head mounted virtual reality device that is associated with that user;
provide the first set of attributes for visual presentment via the virtual reality interface in parallel with the visual presentment of the 360-degree imagery of the first physical location;
provide a visualization of the real-world accessory physically placed within the first physical location, wherein imagery of the real-world accessory based on the 3-D scan is visually presented within the 360-degree imagery of the first physical location as a virtual accessory;
while the plurality of users are viewing the 360-degree imagery of the first physical location through the virtual reality interface, receive a first rating associated with the first physical location from at least one of the plurality of users;
in response to a second location selection received from the presenting user, provide the 360-degree imagery of the second physical location to each of the plurality of users through the head mounted virtual reality device that is associated with that user, and provide the second set of attributes for visual presentment through the virtual reality interface in parallel with the visual presentment of the 360-degree imagery of the second physical location;
provide a visualization of the real-world accessory physically placed within the second physical location, wherein imagery of the real-world accessory based on the 3-D scan is visually presented within the 360-degree imagery of the second physical location as a virtual accessory; and
while the plurality of users are viewing the 360-degree imagery of the second physical location through the virtual reality interface, receive a second rating associated with the second physical location from at least one of the plurality of users.

8. The virtual location management computing system of claim 7, wherein the first set of attributes comprises dimensional information of the first physical location and the second set of attributes comprises dimensional information of the second physical location.

9. The virtual location management computing system of claim 8, wherein the dimensional information of the first set of attributes is collected using laser-aided measurement.

10. The virtual location management computing system of claim 8, wherein the physical attribute is any of a doorway, a window, and a ceiling.

11. The virtual location management computing system of claim 7, wherein the instructions further cause the virtual location management computing system to:
provide access to the 360-degree imagery of the first physical location and the 360-degree imagery of the second physical location for visual presentment by each of the plurality of the virtual reality devices for simultaneous visual presentment to a plurality of users.

12. A multi-user location presentation system comprising:
a server comprising one or more processors and memory;
a plurality of head mounted virtual reality devices in communication with the server, wherein each of the plurality of head mounted virtual reality devices is associated with a respective user of a plurality of users, and wherein the plurality of users comprises a presenting user and at least one viewing user;
wherein the one or more processors are configured to:
receive a set of 360 degree imagery captured at each of a plurality of physical locations, wherein the set of 360 degree imagery is configured to be presented via the plurality of head mounted virtual reality devices as 360 degree virtual reality views of the plurality of physical locations;
receive a 3-D scan of a real-world accessory for subsequent placement into each of a plurality of virtual environments;
store the 3-D scan of the real-world accessory;
cause a physical location selection control to display on a head mounted virtual reality device of the presenting user, wherein the physical location selection control is configured to allow the presenting user to select a physical location from the plurality of physical locations;
for each physical location selected from the plurality of physical locations received from the head mounted virtual reality device of the presenting user:
cause a 360 degree imagery of the selected physical location to display on the plurality of head mounted virtual reality devices;
cause a location input interface to display on the plurality of head mounted virtual reality devices with the 360 degree imagery of the selected physical location, wherein the location input interface is configured to receive one or more inputs from the plurality of users and provide those one or more inputs to the processor, wherein the one or more inputs comprise any of a note describing the physical location, a rating of the physical location, and an attribute of the physical location, and
cause a visualization of the real-world accessory physically placed within the selected physical location, wherein imagery of the real-world accessory based on the 3-D scan is visually presented within the 360-degree imagery of the selected physical location as a virtual accessory.

13. The multi-user location presentation system of claim 12, wherein the one or more processors are configured to receive dimensional information from each of the plurality of physical locations.

14. The multi-user location presentation system of claim 13, wherein the dimensional information visually identifies a dimension of a physical attribute of the plurality of physical locations using an augmented reality display.

15. The multi-user location presentation system of claim 13, wherein the physical attribute is any of a doorway, a window, and a ceiling.

16. The multi-user location presentation system of claim 12, wherein each of the plurality of head mounted virtual reality devices are physically located within the same environment.

17. The multi-user location presentation system of claim 12, wherein one of the plurality of head mounted virtual reality devices is physically located in a different environment than another of the plurality of head mounted virtual reality devices.

18. The multi-user location presentation system of claim 12, wherein the physical location selection control presents the plurality of physical locations in a hierarchy.

19. The multi-user location presentation system of claim 18, wherein the hierarchy comprises a city listing.

20. The multi-user location presentation system of claim 19, wherein the hierarchy comprises a location type listing for each city in the city listing.

\* \* \* \* \*